US010772057B1

(12) United States Patent
Lam et al.

(10) Patent No.: US 10,772,057 B1
(45) Date of Patent: Sep. 8, 2020

(54) SYSTEMS AND METHODS FOR WIRELESS DEVICE SYNCHRONIZATION

(71) Applicant: Hong Kong Applied Science and Technology Research Institute Co., Ltd., Shatin, New Territories (HK)

(72) Inventors: Tak Wing Lam, Kowloon (HK); Kei Keung Hung, Tseung Kwan O (HK); Tak Fuk Wong, Kwai Chung N.T. (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 0 days.

(21) Appl. No.: 16/284,618

(22) Filed: Feb. 25, 2019

(51) Int. Cl.
*H04W 56/00* (2009.01)
*H04B 17/318* (2015.01)
(Continued)

(52) U.S. Cl.
CPC ........ *H04W 56/001* (2013.01); *H04B 17/318* (2015.01); *H04W 76/14* (2018.02); *H04W 84/18* (2013.01)

(58) Field of Classification Search
CPC ... H04W 56/001; H04W 76/14; H04W 84/18; H04W 84/06; H04B 17/318; H04B 7/18528; H04B 7/18571; H04B 7/18576
See application file for complete search history.

(56) References Cited

U.S. PATENT DOCUMENTS 8,614,963 B2 * 12/2013 Singamsetty ........ H04B 1/7143
370/252

10,373,463 B1 * 8/2019 Herring .............. G08B 21/0216
(Continued)

FOREIGN PATENT DOCUMENTS

CN 106851548 A 6/2017
CN 107071697 A 8/2017
(Continued)

OTHER PUBLICATIONS

Gomes, M. P. et al. "Performance Analysis of an Access Scheme Based on Weighted Polling for WBAN," in IEEE 28th International Symposium on Computer-Based Medical Systems, 2015, pp. 157-162, 6 pages.
(Continued)

*Primary Examiner* — Sharad Rampuria
(74) *Attorney, Agent, or Firm* — Norton Rose Fulbright US LLP

(57) ABSTRACT

Systems and methods providing synchronization of wireless device data based upon device synchronization prioritization determinations are described. Embodiments may make device synchronization prioritization determinations using device grouping identifiers with respect to a plurality of wireless devices and/or one or more device synchronization parameters for the wireless devices. Logic of a synchronization prioritization gateway of embodiments may implement a prioritization determination algorithm to determine a sequence of wireless devices for data synchronization for facilitating data synchronization with respect to a plurality of wireless devices in a timely and efficient manner. The logic of the synchronization prioritization gateway may implement a priority penalty attribute with respect to particular wireless devices to address aberrant behavior or other operation likely to impede efficient and/or timely data synchronization.

35 Claims, 9 Drawing Sheets

(51) Int. Cl.
  *H04W 76/14* (2018.01)
  *H04W 84/18* (2009.01)

(56) References Cited

U.S. PATENT DOCUMENTS

2016/0249200 A1\* 8/2016 Liu .................. H04W 4/06
2017/0164224 A1  6/2017 Min et al.

FOREIGN PATENT DOCUMENTS

CN    103327037 B    9/2017
WO    WO-2017064356 A1    4/2017

OTHER PUBLICATIONS

International Search Report and Written Opinion issue for PCT Application No. PCT/CN2019/076448, dated Nov. 28, 2019, 10 pages.

\* cited by examiner

SYSTEMS AND METHODS FOR WIRELESS DEVICE SYNCHRONIZATION

TECHNICAL FIELD

The present invention relates generally to wireless communication and, more particularly, to synchronization of wireless device data.

BACKGROUND OF THE INVENTION

The use of various wireless devices has proliferated in recent years. In particular, many forms of wireless devices used for monitoring (e.g., monitoring environments, movement, conditions, etc.), data collection (e.g., collecting data regarding monitored events and conditions, obtaining data from other devices, etc.), and/or data reporting (e.g., providing collected data to a host system or server, displaying data to a user, etc.) have been deployed in recent years. A particular example of a form of wireless device seeing increased deployment in recent years is the wireless wearable device.

Wireless wearable devices may, for example, be provided in the form of a battery powered personal fitness monitor (e.g., a FITBIT device available from Fitbit, Inc.) or a smartwatch device (e.g., an IWATCH available from Apple Inc.) worn on the wrist of a user and used for health monitoring and physical activity data collection (e.g., monitor steps, heart rate, electrocardiogram, sleep quality, etc.). Processing of the collected data for meaningful, long term, and even shared use typically requires the use of a host personal computing system, data collection and processing server system, etc. Accordingly, wireless wearable devices are often adapted for synchronization of sensor data with a particular system.

In order to provide the requisite wireless communication for data synchronization without unacceptably impacting the battery life of the wireless wearable device, such wireless wearable devices may implement relatively low energy wireless communication techniques. One popular form of relatively low energy wireless communication is Bluetooth-low-energy (BLE) communications. BLE is a wireless personal area network (PAN) technology designed to provide wireless data communication with considerably reduced power consumption and cost while maintaining a similar communication range to that of more traditional PAN wireless communications.

Characteristics of the usage patterns of wireless wearable devices implementing low energy wireless communication techniques, such as BLE, for providing data synchronization include manual intervention and one-to-one connection. For example, the wireless wearable devices generally must be manually paired with a corresponding host (e.g., a user's wireless wearable device in the form of a smartwatch device or personal fitness monitor must be manually paired with the user's host processing device (e.g., smartphone, tablet device, personal computing system, etc.) to establish a PAN for communication of data to/from the wireless wearable device). Moreover, manual intervention by the user is generally initiated in order to synchronize physical activity data with the host processing device. The aforementioned pairing typically provides for a one-to-one connection in which the wireless wearable device may only communicate with one host processing device for data communication and host processing device may only communicate with one wireless wearable device for data communication at any particular time.

There may, however, be situations in which sensor data from a plurality of wireless wearable devices is to be collected. For example, a school may wish to conduct a survey on physical activity of their students, wherein a wireless wearable device of each student may be used for monitoring physical activity. Likewise, a nursing home or hospital facility may wish to monitor the physiological condition and/or physical location of a population of patients, wherein a wireless wearable device of each such patient may be used for their monitoring. Implementing sensor data collection with respect to a plurality of wireless wearable devices presents a number of challenges when attempting to utilize existing low energy wireless communication techniques. For example, where the facility provides wireless wearable devices to the individuals to be monitored, compatibility issues between a participant user's host processing device and the provided wireless wearable device may be present due to heterogeneous host processing platforms and operating system (OS) versions (e.g., BLE not supported, application not supported for an old OS version, etc.), thereby preventing wireless data collection using typical pairing techniques. Providing host processing platforms (e.g., smartphones or tablet devices) to the individuals to be monitored, and thus avoid issues such as the above mentioned compatibility issues, is generally cost prohibitive. Moreover, providing and maintaining software applications (e.g., mobile app) for execution by the participant users' host processing platforms for facilitating collection of the data of a plurality of wireless wearable devices by a data collection and processing server system associated with the facility presents challenges, such as and inconvenience and extra workload for the population being monitored and/or the facility staff.

One attempted solution for sensor data collection with respect to a plurality of devices has been to upload data from a plurality of wireless wearable devices to a data collection and processing server system via one or more gateways, as shown in plural sensor data collection system 100 of FIG. 1. In the example of FIG. 1, data synchronization for a plurality of devices (shown as wireless wearable devices 110A-110H) is provided with respect to a host data collection and processing server system (shown as cloud-based server 130) via gateway 120.

In the illustrated example, gateway 120 provides a network node for interfacing between the wireless wearable devices using BLE communications and the host processing device using Internet protocol (IP) communications. In operation according to existing practice, gateway 120 is installed in a fixed location, wherein the wireless wearable devices may enter and exit the signal coverage area or service area of the gateway. Data of a particular wireless wearable device may be synchronized via data communication with the gateway during such time as the wireless wearable device is adequately served by the gateway. Simple ad hoc synchronization strategies, such as "first come first served" and "strongest RSSI first," are typically used in selecting a particular wireless wearable device for data synchronization between different wireless wearable devices located within the signal coverage area of the gateway.

Although such a gateway may be used to address compatibility issues and may be configured to automatically synchronize physical activity data without manual intervention by the respective users, the use of existing gateway configurations is not without disadvantage. Such a gateway introduces a communications bottleneck in scenarios for sensor data collection for a plurality of devices. The individual wireless wearable devices typically stay within the signal coverage area of the gateway for a limited time slot. BLE provides very limited bandwidth, and the gateway performance determines whether all required sensor data can be collected timely and efficiently during instances when the individual wireless wearable devices are within signal coverage area of the gateway. Wireless wearable devices enter or leave the coverage of gateway at any time, and disconnection frequently occurs during synchronization. Moreover, repeated reconnection of the wireless wearable devices with the gateway drains battery life of the wireless wearable devices. Irrespective of whether data synchronization is accomplished, the wireless wearable devices generate new sensor data continuously, which ideally is to be timely communicated to the host processing system. Simple ad hoc synchronization strategies cannot easily optimize the data synchronization performance provided by operation of the gateway. For example, effective prioritization is not provided to facilitate synchronization of data that may become stale while one or more wireless wearable devices dominate the data communications. All the foregoing factors affect the data synchronization performance of the sensor data collection system.

The existing data synchronization techniques that utilize gateway implementations have not adequately addressed the above deficiencies. As one specific example, sensor data collection via a gateway as described in patent application publication number US 2017/0164224 A1, the disclosure of which is incorporated herein by reference, focuses on how to manage the sensor devices, and does not provide optimization on the synchronization performance. As another specific example, sensor data collection via a base station as described in patent application publication number CN 107071697 A, the disclosure of which is incorporated herein by reference, provides for data synchronization based on receive signal strength indicator (RSSI) and channel quality, and also does not provide optimization on the synchronization performance. Moreover, neither US 2017/0164224 A1 nor CN 107071697 A provide any means to address operation with respect to unstable wireless wearable devices (e.g., devices moving in and out of the signal coverage area of a gateway) or to effectively prioritize data communication for efficiently and timely synchronizing the wireless wearable communication devices.

BRIEF SUMMARY OF THE INVENTION

The present invention is directed to systems and methods providing synchronization of wireless device data based upon device synchronization prioritization determinations. Embodiments of the invention may, for example, make device synchronization prioritization determinations using device grouping identifiers with respect to a plurality of wireless devices for which data synchronization is to be provided. In operation according to embodiments, a device synchronization determination may be made using a device grouping identifier and one or more device synchronization parameters for each wireless device of a plurality of wireless devices operating within a signal coverage area of a gateway. For example, logic of a synchronization prioritization gateway of embodiments may implement a prioritization determination algorithm to determine a sequence of wireless devices for data synchronization for facilitating data synchronization with respect to a plurality of wireless devices in a timely and efficient manner.

Each wireless device for which device synchronization is provided may be assigned or otherwise associated with a device grouping identifier used in device synchronization determinations according to concepts herein. For example, device grouping identifiers in the form of area IDs corresponding to one or more associated synchronization prioritization gateway (e.g., synchronization prioritization gateways each disposed in a respective area corresponding to their associated area ID(s)) may be provided to wireless devices. In operation according to embodiments, logic of the synchronization prioritization gateways may utilize the device grouping identifier for each respective wireless device within a signal coverage area of the gateway in determining prioritization for data synchronization. For example, wireless devices having area IDs corresponding to an area ID associated with the synchronization prioritization gateway may be considered for higher priority data synchronization than wireless devices having area IDs that do not correspond to an area ID associated with the synchronization prioritization gateway. Accordingly, embodiments of the present invention effectively prioritize data communication for efficiently and timely synchronizing the wireless wearable communication devices through the use of a group prioritization technique, wherein wireless devices are grouped by device grouping identifiers (e.g., area IDs) and a particular synchronization prioritization gateway serves wireless devices belonging to other groups with lower priority.

Prioritization determinations made by logic of a synchronization prioritization gateway with respect to wireless devices operating within a signal coverage area of the gateway are preferably based at least in part on one or more device synchronization parameters for each respective wireless device, in addition to the above mentioned device grouping identifier. Accordingly, multiple attribute prioritization determination based data synchronization is provided according to embodiments of the invention. For example, in addition to an area ID corresponding to an area ID of the synchronization prioritization gateway used in considering a wireless device for higher priority data synchronization, device synchronization parameters for the wireless device, such as synchronization completed time, last connection time, and/or communication link metrics, may be used in considering a respective wireless device for higher priority data synchronization.

Multiple attribute prioritization determinations implemented according to embodiments of the invention may utilize attributes in addition to or in the alternative to device grouping identifiers and/or device synchronization parameters. For example, logic of a synchronization prioritization gateway may implement a priority penalty attribute with respect to particular wireless devices to address aberrant behavior or other operation likely to impede efficient and/or timely data synchronization. For example, embodiments of the invention may implement a priority penalty attribute in the form of an instability penalty to addresses operation with respect to unstable wireless devices (e.g., devices moving in and out of the signal coverage area of a synchronization prioritization gateway) to decrease the synchronization priority of such an unstable wireless device.

Synchronization prioritization gateways configured in accordance with concepts of the present invention are well suited for use with respect to relatively low energy wireless communication techniques, such as Bluetooth-low-energy (BLE) communications. For example, although low energy wireless communication techniques may provide very limited communication bandwidth, a synchronization prioritization gateway of embodiments facilitates a many-to-one relationship (i.e., many wireless devices to one gateway) in which synchronization performance is optimized through the use of multiple attribute prioritization determinations, wherein aberrant behavior of individual wireless devices may be addressed, to facilitate efficient and timely data synchronization.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying drawings, in which.

DETAILED DESCRIPTION OF THE INVENTION

Figure 1:
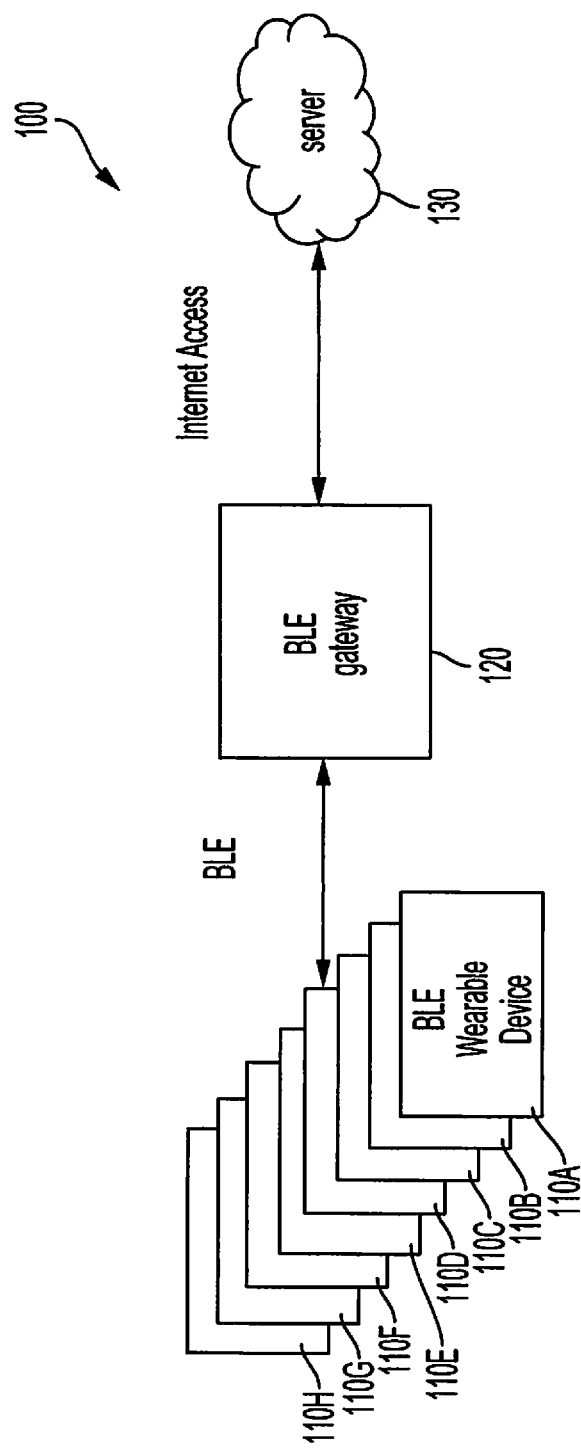
FIG. 1 shows a plural sensor data collection system implementing ad hoc synchronization strategies.
Figure 2:
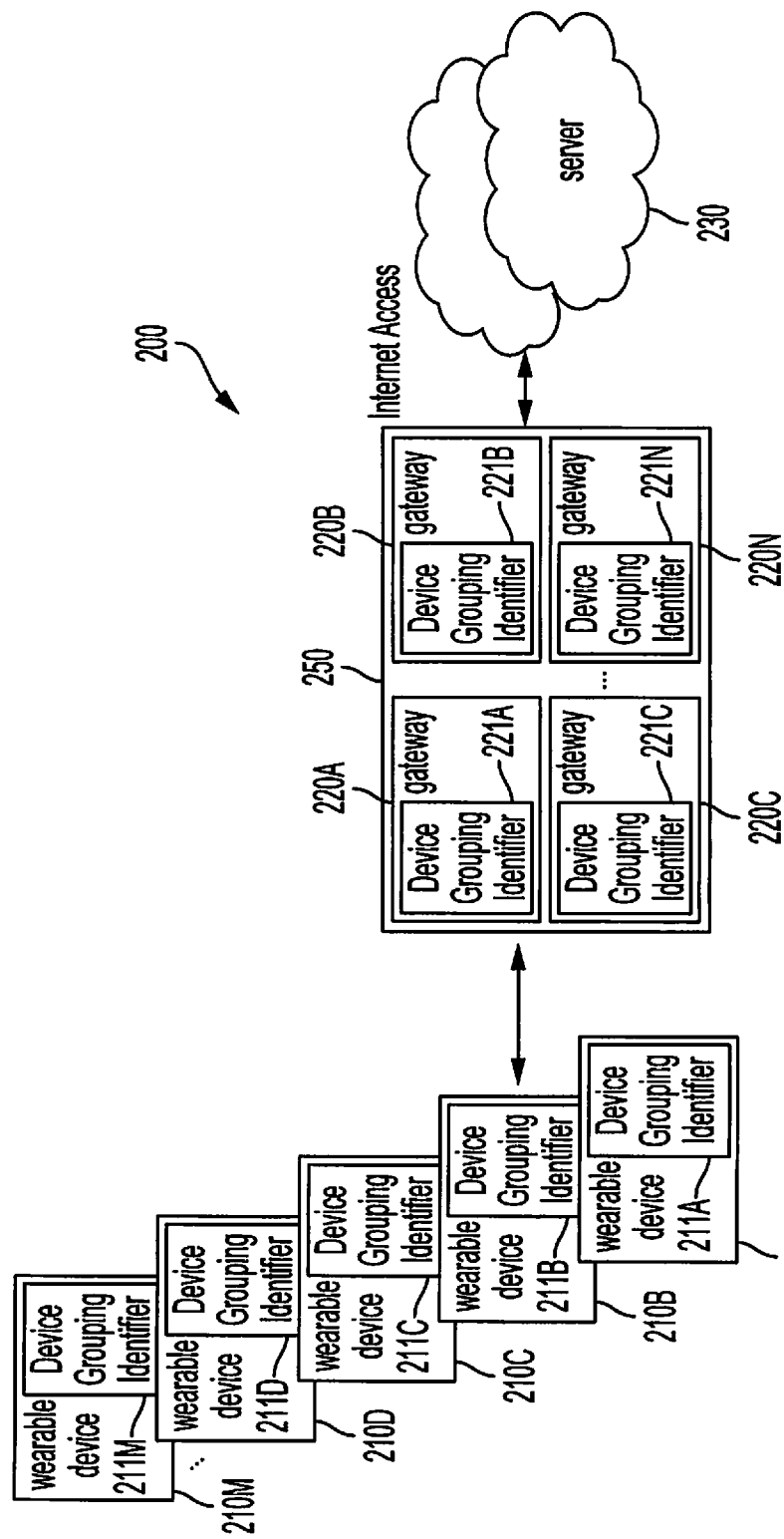
FIG. 2 shows a group-based data synchronization system implementing device synchronization prioritization determinations in accordance with embodiments of the present invention.

FIG. 2 shows group-based data synchronization system 200 configured to provide synchronization of wireless device data based upon device synchronization prioritization determinations according to concepts of the present invention. In the embodiment of FIG. 2, data synchronization for one or more groups of wireless devices (shown as wireless devices 210A-210M) is provided with respect to a host data collection and processing system (shown as cloud-based system 230) via synchronization prioritization gateways 220A-220N. Each wireless device of wireless devices 210A-210M, each gateway of synchronization prioritization gateways 220A-220N, and systems (e.g., servers) of cloud-based system 230 comprise processor-based systems, such as may comprise general purpose processors (e.g., CORE processor available from Intel Corporation, RADEON processor available from Advanced Micro Devices, Inc., POWERPC processor available from International Business Machines, advanced reduced instruction set computer machine (ARM) central processing unit (CPU) core, and/or the like) and/or special purpose processors (e.g., application specific integrated circuit (ASIC), field programmable gate array (FPGA), graphics processing unit (GPU), and/or the like), operable to execute code segments and/or other forms of logic circuits to perform functions as described herein. The processor-based systems may comprise one or more memories (e.g., random access memory (RAM), read only memory (ROM), flash memory, magnetic memory, optical memory, and/or the like) suitable for storing one or more instruction sets (e.g., application software, firmware, operating system, applets, and/or the like), data (e.g., configuration parameters, operating parameters, collected data, processed data, and/or the like), etc. utilized in accordance with concepts of the present invention.

Wireless devices 210A-210M for which data synchronization is provided by synchronization prioritization gateways 220A-220N of embodiments of the invention may, for example, comprise wireless devices in the form of wireless wearable devices. Examples of wireless wearable devices for which group-based data synchronization may be provided in accordance with the concepts herein include, but are not limited to, personal fitness monitors, smartwatch devices, game controllers, wireless camera shutter remotes, wearable Internet of things (IoT) devices, processor-based eyewear, body camera devices, optical head-mounted displays, smart jewelry, earbuds, wearable biometric sensors, augmented reality (AR)/virtual reality (VR) headsets, smart technology footwear, etc. Additionally or alternatively, one or more of wireless devices 210A-210M may comprise various other forms of wireless devices, such as mobile processor-based systems, smartphones, tablet devices, Internet appliances, IoT devices, etc. Wireless devices 210A-210M of embodiments may comprise one form of such wireless devices or a combination of various forms of such wireless devices.

Synchronization prioritization gateways 220A-220N of a group-based synchronization system may be installed in fixed locations, wherein wireless devices may enter and exit the signal coverage area or service area of the gateway. For example, each of synchronization prioritization gateways 220A-220N of the exemplary embodiments may be disposed in a respective predefined area (e.g., a sub-area) of group-based data synchronization service area 250. Group-based data synchronization service area 250 may, for example, comprise a facility or campus of an entity for which wireless device data synchronization is to be provided. On a larger scale, group-based data synchronization service area 250 may comprise a borough, a city, a county, a state, a country, etc. The sub-areas in which respective gateways are disposed according to embodiments may comprise logical or physical subdivisions of group-based data synchronization service area 250, such as classrooms, hospital rooms, guest rooms, offices, cubicles, floors of buildings, buildings, city blocks, zip code areas, voting districts, etc., with which individual wireless devices may be associated.

Synchronization of wireless device data based upon device synchronization prioritization determinations as provided by synchronization prioritization gateways 220A-220N of embodiments of the invention facilitate group-based data synchronization with respect to wireless devices 210A-210M. Group-based data synchronization system 200 of embodiments may, for example, support large scale group-based sensor data collecting such as for elderly health monitoring, group fitness training, student physical activity surveying, animal activity monitoring (pets, farming), etc.

Figure 3:
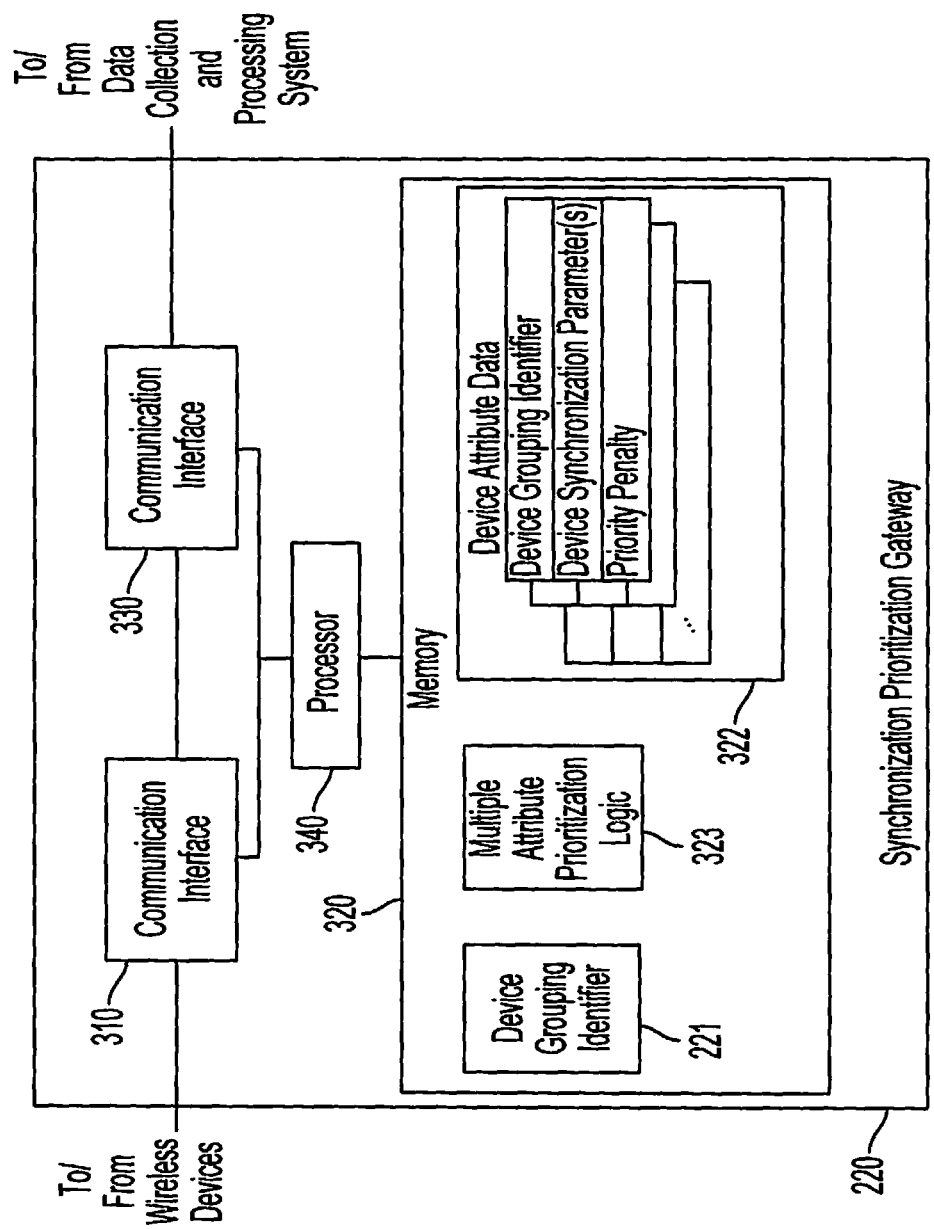
FIG. 3 shows detail with respect to a synchronization prioritization gateway in a group-based data synchronization system of embodiments of the present invention.

Additional detail with respect to embodiments of a synchronization prioritization gateway configured to provide synchronization of wireless device data based upon device synchronization prioritization determinations in accordance with concepts of the present invention is shown in FIG. 3. Synchronization prioritization gateway 220 shown in FIG. 3 may, for example, provide an implementation for any of synchronization prioritization gateways 220A-220N shown in FIG. 2.

Synchronization prioritization gateway 220 of the illustrated embodiment is configured to provide a network node for interfacing between wireless devices (e.g., wireless devices 210A-210M) using first communications protocol and a host processing device (e.g., cloud-based system 230) using a second communication protocol, wherein the first and second communications protocols may be different. Accordingly, synchronization prioritization gateway 220 shown in FIG. 3 comprises communication interface 310 for facilitating communication for data synchronization with the wireless devices and communication interface 330 for facilitating communication for data synchronization with the host processing device. In accordance with embodiments of the invention, the communications protocol utilized by the wireless devices may comprise a low energy wireless communications protocol, such as Bluetooth-low-energy (BLE) communications, to facilitate extended battery-based operation of the wireless devices. Accordingly, communication interface 310 may comprise a communication interface configured in accordance with a low energy wireless communication protocol, such as the BLE protocol. The communication protocol utilized for communicating with the host processing device may comprise a communications protocol, such as Internet protocol (IP) communications, well suited for facilitating communication with a variety of host systems, enabling communications via local area networks (LANs), wide area networks (WANs), the Internet, cellular communication systems, cable transmission systems, the public switched telephone network (PSTN), etc. Accordingly, communication interface 330 may comprise a communication interface configured in accordance with a communication protocol suited for communication with a variety of host systems, such as the IP protocol.

Synchronization prioritization gateway 220 is configured to provide synchronization of wireless device data based upon device synchronization prioritization determinations. Accordingly, synchronization prioritization gateway 220 of the illustrated embodiment comprises processor 340 coupled to memory 320 storing one or more instruction sets (e.g., application software, firmware, operating system, applets, and/or the like), data (e.g., configuration parameters, operating parameters, collected data, processed data, and/or the like), etc. utilized in accordance with concepts of the present invention. In the exemplary embodiment shown in FIG. 3, memory 320 stores device grouping identifier 221, multiple attribute prioritization logic 323, and device attribute data 322, the use and operation of which will be better understood from the description that follows.

Referring again to group-based data synchronization system 200 of FIG. 2, in operation according to embodiments of the invention, each gateway of synchronization prioritization gateways 220A-220N operates to provide data synchronization with respect to ones of wireless devices 210A-210M operating within a signal coverage area of the gateway based on synchronization prioritization determinations using device grouping identifiers. In facilitating such synchronization prioritization determinations in accordance with concepts herein, wireless devices 210A-210M of the illustrated embodiment each have one or more respective device grouping identifier associated therewith. Correspondingly, synchronization prioritization gateways 220A-220N of the illustrated embodiment each have one or more device grouping identifier associated therewith. In the exemplary implementation shown in FIG. 2, memory elements of wireless devices 210A-210M store device grouping identifiers 211A-211M, respectively, and memory elements of synchronization prioritization gateways 220A-220N store device grouping identifiers 221A-221N (e.g., memory 320 storing device grouping identifier 221 as shown in FIG. 3), respectively.

The device grouping identifiers of embodiments comprise values (e.g., a numeric value, a character, a symbol, and/or the like) used for associating particular wireless devices and particular synchronization prioritization gateways into groups for group-based data synchronization. Accordingly, the particular device grouping identifier(s) associated with any wireless device of wireless devices 210A-210M may have the same or different value, depending upon the desired groupings of wireless devices. Likewise, the particular device grouping identifier(s) associated with any gateway of synchronization prioritization gateways 220A-220N may have the same or different values. However, as will be better understood from the discussion below, one or more wireless device of wireless devices 210A-210M has a device grouping identifier value associated therewith which corresponds to the device grouping identifier value of one or more gateway of synchronization prioritization gateways 220A-220N.

Device synchronization determinations may be made by synchronization prioritization gateways 220A-220N using device grouping identifiers (e.g., device grouping identifiers 211A-211M) for each wireless device of wireless devices 210A-210N that is operating within a signal coverage area of the particular gateway making the determination (e.g., each wireless device operating within the gateway signal coverage area may report a device grouping identifier value). In operation according to embodiments, logic (e.g., multiple attribute prioritization logic 323 shown in FIG. 3) of synchronization prioritization gateways 220A-220N may implement a prioritization determination algorithm to determine a sequence of wireless devices operating within their signal coverage area for data synchronization. For example, wireless devices of wireless devices 210A-210M operating in the signal coverage area of a particular gateway of synchronization prioritization gateways 220A-220N having device grouping identifier values corresponding to a device grouping identifier value for that particular gateway may be given priority for data synchronization by operation of multiple attribute prioritization logic 323 implementing the device synchronization determination in accordance with embodiments (e.g., wireless devices having a device grouping identifier value corresponding to a device grouping identifier value associated with the synchronization prioritization gateway may be considered for higher priority data synchronization than wireless devices having device grouping identifier values that do not correspond to a device grouping identifier value associated with the synchronization prioritization gateway).

The device synchronization determinations may be made by synchronization prioritization gateways 220A-220N using one or more device attribute (e.g., device attribute data 322) for each wireless device of wireless devices 210A-210N that is operating within a signal coverage area of the particular gateway making the determination (e.g., the gateway may measure, monitor, and/or determine one or more device attribute, such as may comprise synchronization parameters, priority penalties, etc., for each wireless device operating within the gateway signal coverage area for use in device synchronization determinations). In operation according to embodiments, as among wireless devices having a device grouping identifier value corresponding to that of the gateway, priority may be further given for data synchronization based upon one or more device attribute for those wireless devices by operation of multiple attribute prioritization logic 323 implementing the device synchronization determination. For example, prioritization determinations made by multiple attribute prioritization logic 323 with respect to wireless devices operating within a signal coverage area of the gateway may be based at least in part on one or more device synchronization parameters for each respective wireless device (e.g., device synchronization parameters of device attribute data 322), in addition to the above mentioned device grouping identifier. Accordingly, in addition to a device grouping identifier corresponding to a device grouping identifier of the synchronization prioritization gateway used in considering a wireless device for higher priority data synchronization, device synchronization parameters for the wireless device, such as synchronization completed time, last connection time, and/or communication link metrics (e.g., received signal strength indicator (RSSI), channel quality indicator (CQI), bit error rate (BER), BLE connection interval, etc.), may be used in considering a respective wireless device for higher priority data synchronization. Additionally or alternatively, multiple attribute prioritization logic 323 of embodiments may implement a priority penalty attribute with respect to particular wireless devices (e.g., priority penalties of device attribute data 322) to address aberrant behavior or other operation likely to impede efficient and/or timely data synchronization. For example, embodiments of the invention may implement a priority penalty attribute in the form of an instability penalty to addresses operation with respect to unstable wireless devices (e.g., devices moving in and out of the signal coverage area of a synchronization prioritization gateway) to decrease the synchronization priority of such an unstable wireless device. It can be appreciated from the foregoing that multiple attribute prioritization logic 323 of embodiments provides device synchronization determinations based upon multiple prioritization attributes.

To aid in understanding concepts of the present invention, deployment and operation of an exemplary implementation of group-based data synchronization system 200 of FIG. 2 will be described in which wireless devices 210A-210M comprise BLE enabled wireless wearable devices and synchronization prioritization gateways 220A-220M are associated with sub-areas (e.g., classrooms, patient rooms, guest rooms, offices, etc.) of data synchronization service area 250 (e.g., school, hospital, hotel, business campus, etc.), and thus device grouping identifiers 211A-211M and 221A-221N comprise area ID values. It should be appreciated, however, that the particulars of the example are provided for facilitating an understanding of the present invention and are not limiting with respect to the applicability of the concepts herein.

In operation of the exemplary implementation of group-based data synchronization system 200 the wireless wearable devices of wireless devices 210A-210M generate sensor data and synchronize the sensor data to one or more servers of cloud-based system 230 via synchronization prioritization gateways 220A-220N. In this exemplary embodiment, the servers of cloud-based system 230 manage wireless devices 210A-210M and synchronization prioritization gateways 220A-220N, such as to provision the wireless devices and/or gateways, to control the collection and reporting of sensor data, etc. For example, logic of one or more server of cloud-based system 230 providing provisioning operation may generate a global security key and area ID value for each of gateway of synchronization prioritization gateways 220A-220N and wireless wearable device of wireless devices 210A-210M. Global security keys of the provisioning information may, for example, be used by the group-based data synchronization system for authenticating wireless devices and/or gateways, for filtering unrelated BLE enabled wireless devices from device synchronization operation, etc. The area ID values of the provisioning information may be provided as device grouping identifiers used for grouping various ones of the wireless wearable devices and synchronization prioritization gateways. Such provisioning information may be transmitted to the wireless wearable devices and/or gateways via a network connection, may be transmitted to a user thereof for manual inputting into the wireless wearable devices and/or gateways, may be installed in the wireless wearable devices and/or gateways at a time of manufacture, sale, or delivery, etc.

Synchronization prioritization gateways 220A-220N of the exemplary embodiment are preferably installed in a respective sub-area (e.g., classrooms, patient rooms, guest rooms, offices, etc.) of data synchronization service area 250 (e.g., school, hospital, hotel, business campus, etc.). Accordingly, an area ID value provisioned to each synchronization prioritization gateway may correspond to the respective sub-area of data synchronization service area 250 in which the gateway is deployed. For example, the area ID values may range from Area_1 to Area_N for the sub-areas of data synchronization service area 250, wherein synchronization prioritization gateway 220A disposed in sub-area 1 is provided area ID value Area_1, synchronization prioritization gateway 220B disposed in sub-area 2 is provided area ID value Area_2, synchronization prioritization gateway 220C disposed in sub-area 3 is provided area ID value Area_3, and so on to synchronization prioritization gateway 220N disposed in sub-area N is provided area ID value Area_N.

Wireless devices 210A-210M of the exemplary embodiment may be primarily operated within, or otherwise associated with, a particular sub-area (e.g., classrooms, patient rooms, guest rooms, offices, etc.) of data synchronization service area 250 (e.g., school, hospital, hotel, business campus, etc.). Accordingly, an area ID value provisioned to each wireless device may correspond to the respective sub-area of data synchronization service area 250 to which the wireless device is associated. For example, in the above example where the area ID values range from Area_1 to Area_N for the sub-areas of data synchronization service area 250, wireless devices associated with sub-area 1 are provided area ID value Area_1, wireless devices associated with sub-area 2 are provided area ID value Area_2, wireless devices associated with sub-area 3 are provided area ID value Area_3, and so on to wireless devices associated with sub-area N being provided area ID value Area_N. Accordingly, each of wireless devices 210A-210M may be provided with an indication affiliation with a particular sub-area of data synchronization service area 250 based upon an area ID value provided thereto.

It should be appreciated that synchronization prioritization gateways and/or wireless devices of embodiments of the present invention may have more than one device grouping identifier associated therewith. For example, in addition to the above mentioned area ID values (i.e., Area_1 to Area_N) for the sub-areas of data synchronization service area 250, one or more additional ID values may be provided for use by the synchronization prioritization gateways and/or wireless devices. As a specific example, an area ID value (e.g., Area_0) may be provided for the overall data synchronization area, for groups of the sub-areas, etc. Such additional area ID values may, for example, we used to indicate affiliation with the group-based data synchronization system itself, with nested portions of the data synchronization service area, and/or the like.

Once provisioned and deployed, the wireless wearable devices of wireless devices 210A-210M may operate to continuously generate sensor data, wherein the collected sensor data is to be provided to cloud-based system 230, such as for collection, processing, and/or analysis. Operation by a wireless wearable device of wireless devices 210A-210M for providing collected sensor data to cloud-based system 230 via a gateway of synchronization prioritization gateways 220A-220N is shown generally in flow 400 of FIG. 4.

Figure 4:
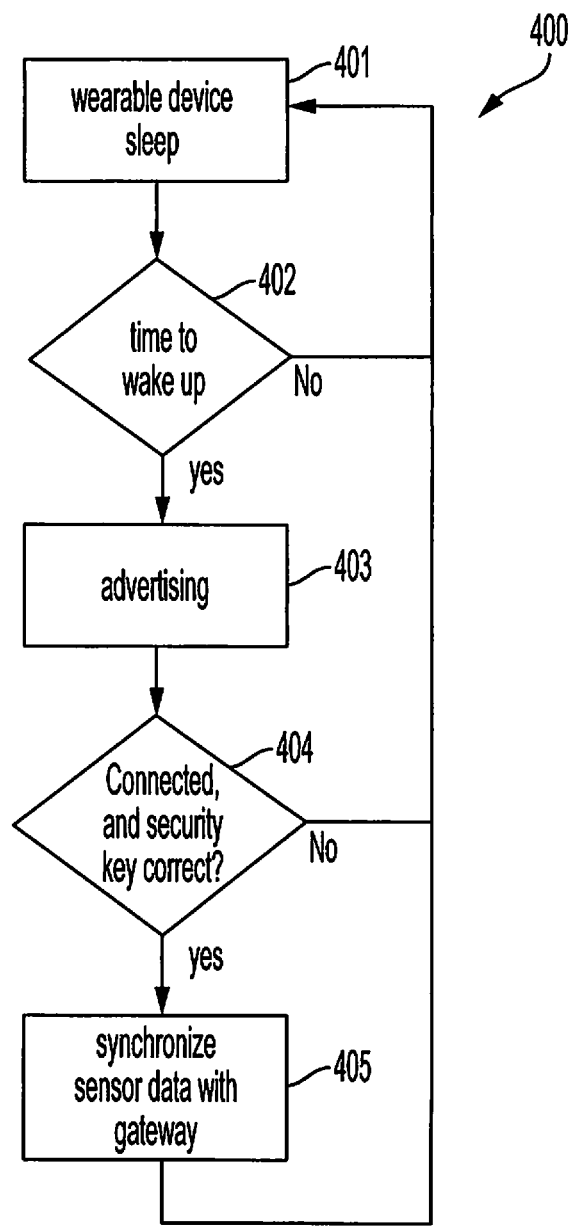
FIG. 4 shows a flow diagram of operation of a wireless device for which data synchronization operation is provided in a group-based data synchronization system of embodiments of the present invention.

As may be seen in flow 400 of FIG. 4, the wireless wearable device of embodiments periodically attempts to establish a communication link with a synchronization prioritization gateway for data synchronization operation. For example, the wearable device may operate in a non-connected state (e.g., low power state, such as a sleep state) for some period of time at block 401. At block 402, logic of the wireless wearable device determines if it is time to attempt connection with a synchronization prioritization gateway for data synchronization. For example, a sleep period may be determined to have expired, a particular event triggering sensor data reporting may be detected, etc. If it is determined that it is not time to attempt connection with a synchronization prioritization gateway, processing according to the illustrated embodiment returns to block 401 for operation in a non-connected state. However, if it is determined that it is time to attempt connection with a synchronization priority gateway, processing according to the illustrated embodiment proceeds to block 403 for operation to attempt to initiate a connection with a synchronization priority gateway.

Figure 5:
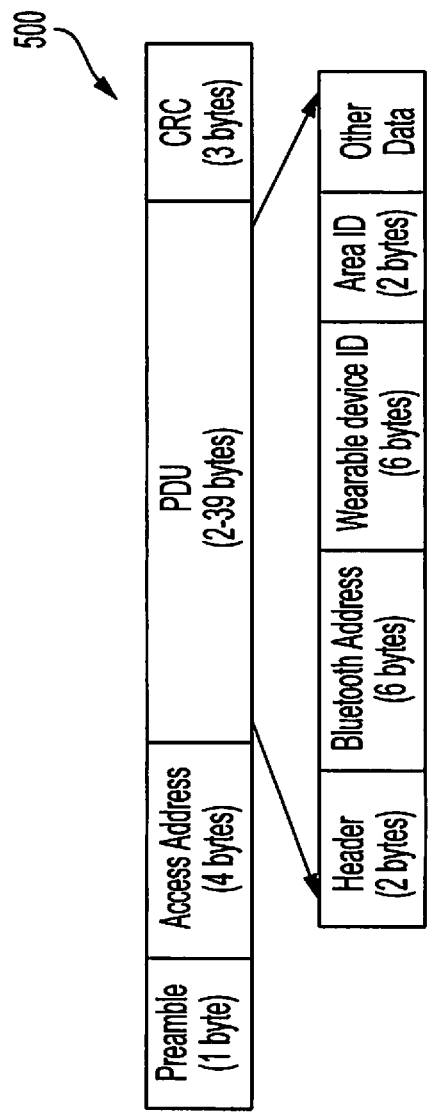
FIG. 5 shows a format of an advertising packet as utilized in group-based data synchronization of embodiments of the present invention.

At block 403 of flow 400 shown in FIG. 4 the wireless wearable device advertises its presence and desire to connect by transmitting one or more BLE advertising packets. BLE advertising packets utilized according to embodiment of the invention comprise a device grouping identifier for the wireless wearable device used for device synchronization determinations according to concepts of the invention. For example, continuing with the above example using area ID values, BLE advertising packet format 500 shown in FIG. 5, which includes an Area ID field, may be transmitted by the wireless wearable device to advertises its presence and desire to connect with a synchronization prioritization gateway. The BLE advertising packets may include additional information utilized by synchronization prioritization gateways of embodiments. For example, unique device identification information (e.g., the wearable device ID, such as may comprise an electronic serial number (ESN), media access control (MAC) address, etc.) may be included in one or more field of BLE advertising packet format 500.

Having advertised its presence and desire to connect, logic of the wireless wearable device determines if it is to perform data synchronization at block 404. For example, determinations may be made with respect to whether a communication connection has been established with a synchronization prioritization gateway (e.g., the gateway may not establish a connection with the wireless device for data synchronization based upon a device synchronization determination, the wireless wearable device may not be in the signal coverage area of a gateway, the gateway may be temporarily unavailable, etc.) and whether authentication is affirmed (e.g., the global security keys match, data decoding is successful, etc.). If it is determined that data synchronization is not to be performed, processing according to the illustrated embodiment returns to block 401 for operation in a non-connected state. However, if it is determined that data synchronization is to be performed, processing according to the illustrated embodiment proceeds to block 405 for data synchronization communication between the wireless wearable device and the synchronization prioritization gateway.

At block 405 of flow 400 shown in FIG. 4, the wireless wearable device and synchronization prioritization gateway cooperate to perform data synchronization. For example, the wireless wearable device may transmit sensor data to the synchronization prioritization gateway, which in turn may transmit the sensor data to one or more servers of the cloud-based system. After performing data synchronization, processing according to the illustrated embodiment of flow 400 returns to block 401 for operation of the wireless wearable device in a non-connected state.

Figure 6:
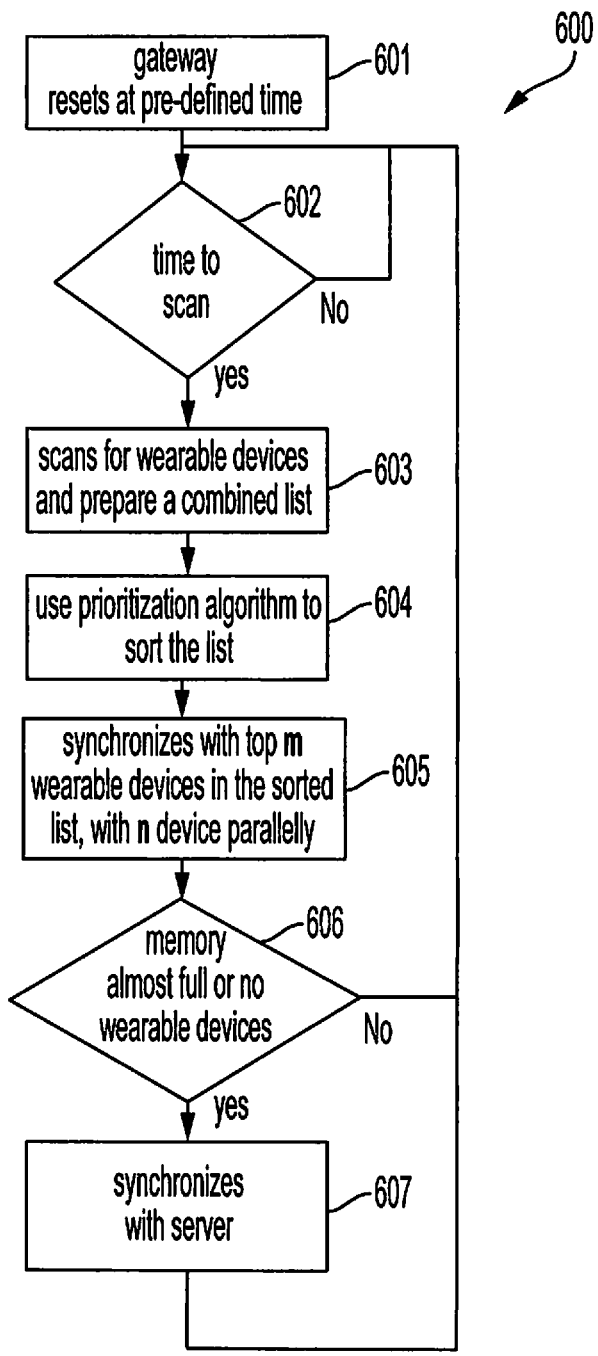
FIG. 6 shows a flow diagram of operation of a synchronization prioritization gateway providing data synchronization operation in a group-based data synchronization system of embodiments of the present invention.

Operation by a gateway of synchronization prioritization gateways 220A-220N for providing synchronization of wireless device data for wireless devices 210A-210N based upon device synchronization prioritization determinations is shown generally in flow 600 of FIG. 6. Operation according to the illustrated embodiment of flow 600 provides for resetting of the synchronization prioritization gateway from time to time at block 601. For example, synchronization prioritization gateways of embodiments may reset at a predefined time (e.g., at mid-night) to clear various information (e.g., one or more device synchronization parameters, such as synchronization status information, etc.), such as to make sure that the synchronization prioritization gateway has enough memory to run for a period of time.

As may be seen in flow 600 of FIG. 6, the synchronization prioritization gateway of embodiments periodically attempts to establish communication links with wireless wearable devices for data synchronization operation. Accordingly, at block 602, logic of the synchronization prioritization gateway determines whether it is time to perform scanning for wireless wearable devices operating within a signal coverage area of the gateway. For example, a scanning period window may open, a sleep period may be determined to have expired, a particular event triggering data synchronization operation may be detected, etc. If it is determined that it is not time to perform scanning for wireless wearable devices, processing according to the illustrated embodiment loops back to block 602 for repeated operation to determine whether it is time to perform scanning for wireless wearable devices. However, if it is determined that it is time to perform scanning for wireless wearable devices operating within a signal coverage area of the gateway, processing according to the illustrated embodiment proceeds to block 603 for operation to initiate scanning for wireless wearable devices operating within a signal coverage area of the gateway.

At block 603, the synchronization prioritization gateway scans for wireless wearable devices in a signal coverage area thereof and prepares a list or database of information with respect to the wireless wearable devices detected. For example, logic of the synchronization prioritization gateway may control a BLE scanning procedure to receive BLE advertising packets transmitted by wireless wearable devices operating in the signal coverage area of the gateway. In operation according to embodiments, logic of the synchronization prioritization gateway filters transmissions received from unrelated BLE devices (e.g., BLE devices which are not associated with group-based data synchronization system 200), such as by filtering based on wearable device ID, no or unrelated device grouping identifier, and/or the like. However, for other wireless wearable devices (e.g., BLE devices which are associated with group-based data synchronization system 200), logic of the synchronization prioritization gateway operates to store information with respect to the wireless wearable devices detected, such as to prepare a list or database used in device synchronization determination. The information may include information transmitted by the wireless wearable devices (e.g., wearable device ID, area ID value, etc.) as well as information measured, monitored, and/or determined by the gateway (e.g., one or more device attribute, such as synchronization parameters, priority penalties, etc., synchronization status information, such as connection time stamps, synchronization time stamps, synchronization success/failure indicators, etc.).

The table below shows an example of scanning results information as may be stored by a synchronization prioritization gateway of embodiments. The information stored for each wireless wearable device detected by the synchronization prioritization gateway in the below example includes wearable device ID (e.g., the wearable device ID advertised by the wireless wearable device) and area ID value (e.g., the area ID of the device grouping identifier advertised by the wireless wearable device, such as may be a particular value of Area_1 to Area_N assigned to the wireless wearable device) transmitted by the respective wireless wearable devices. The information stored for each wireless wearable device detected by the synchronization prioritization gateway in the below example also includes device synchronization parameters in the form of RSSI (e.g., the received signal strength indicator measured during BLE scanning procedure).

| Scanning Results | | |
|---|---|---|
| Wearable Device ID | Area ID | RSSI (dBm) |
| d1 | Area_2 | −65 |
| d2 | Area_1 | −70 |
| d3 | Area_1 | −60 |
| . . . | . . . | . . . |

The table below shows an example of synchronization status information as may be stored by a synchronization prioritization gateway of embodiments. Accordingly, the information stored for each wireless wearable device detected by the synchronization prioritization gateway in this example also includes last connection time information (e.g., the epoch timestamp of the connection established between the gateway and the wireless wearable device, wherein the value '−1' is defaulted for no record) and synchronization completed time information (e.g., the epoch timestamp when all sensor data in the wireless wearable device has been successfully synchronized with gateway, wherein the value '−1' is defaulted for no record), indexed by using the respective wearable device ID mentioned above.

| Synchronization Status | | |
|---|---|---|
| Wearable Device ID | Last Connection Time | Synchronized Completed Time |
| d1 | −1 | −1 |
| d2 | 1542679217 | −1 |
| d3 | 1542666666 | 1542666766 |
| . . . | . . . | . . . |

Having scanned for wireless wearable devices operating in the signal coverage area and having stored device grouping identifier information and device synchronization parameters for the detected wireless wearable devices, operation according to flow 600 illustrated in FIG. 6 proceeds to block 604 wherein logic of the synchronization prioritization gateway executes a device synchronization prioritization determination algorithm for determining synchronization priorities for data synchronization of the wireless wearable devices. The device synchronization prioritization determination algorithm of embodiments implements multiple attribute prioritization determinations utilizing various attributes, such as device grouping identifiers and device synchronization parameters, for each wireless wearable device detected when performing the scanning procedure. Additionally, embodiments of a device synchronization prioritization determination algorithm executed by logic of a synchronization prioritization gateway may implement a priority penalty attribute with respect to one or more of the wireless wearable devices, such as to address aberrant behavior or otherwise undesirable operation (e.g., repeated dropped connections/inability to maintain a connection, poor data communication connection, etc.). Embodiments of a synchronization prioritization gateway executing a device synchronization prioritization determination algorithm operate to sort the wireless wearable devices detected during the scanning procedure, such as using the aforementioned information with respect to the wireless wearable devices detected stored by the gateway (e.g., the information of the foregoing scanning results table and synchronization status table).

Figure 7:
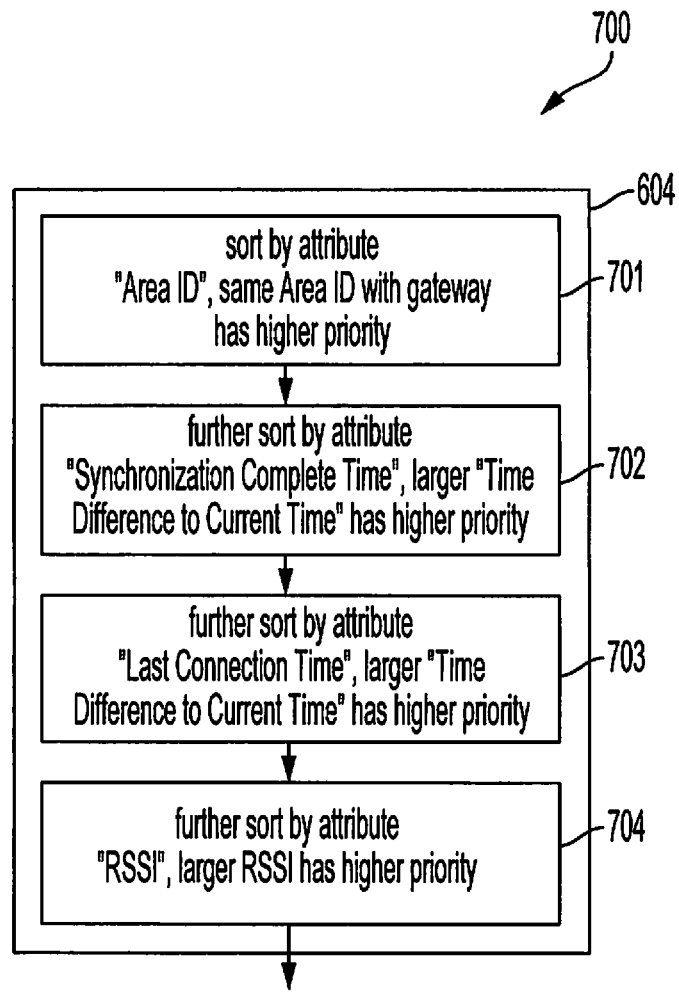
FIG. 7 shows a flow diagram of a device synchronization prioritization determination algorithm as implemented by a synchronization prioritization gateway providing data synchronization operation in a group-based data synchronization system of embodiments of the present invention.

FIG. 7 shows details of an example device synchronization prioritization algorithm as may be utilized by embodiments of a synchronization prioritization gateway to sort the synchronization order of the wireless wearable devices. The functions of blocks 701-704 shown in FIG. 7 may, for example, be performed as the device synchronization prioritization determination algorithm executed at block 604 of flow 600.

At block 701 of the device synchronization prioritization determination algorithm of the illustrated embodiment, the wireless wearable devices are sorted by their respective device grouping identifier attribute. Continuing with the above example wherein area ID values are assigned to the wireless wearable devices, the wireless wearable devices may be sorted by their respective area ID values. For example, wireless wearable devices that have an area ID value that is the same as an area ID value for the synchronization prioritization gateway may be given a higher priority in the sorting operation than wireless wearable devices having area ID values that are not the same as an area ID value for the synchronization prioritization gateway. If no wireless wearable device has an area ID value that is the same as an area ID value for the synchronization prioritization gateway, then all wireless wearable devices are given the same priority at this step in the device synchronization prioritization determination algorithm according to embodiments. In a somewhat similar case, the synchronization prioritization gateway may be assigned a special area ID (e.g., Area_0) for equally serving all groups of wireless wearable devices in the group-based data synchronization system. If the synchronization prioritization gateway has the special area ID value assigned thereto, then all wireless wearable devices are given the same priority at this step in the device synchronization prioritization determination algorithm according to embodiments.

The wireless wearable devices are further sorted according to various device synchronization parameters at each of blocks 702-704 of the illustrated synchronization prioritization algorithm. The sorting of wireless wearable devices at each of blocks 702-704 is performed with respect to wireless wearable devices having the same priority given them in the previous step of the synchronization prioritization determination algorithm. However, in situations where there are no wireless wearable devices with a same priority to sort (e.g., if all wireless wearable devices have synchronized data completely once in steps 702 and 703, or if all wireless wearable devices have been connected once but some have not synchronized data completely once in step 704) at a particular block, embodiments of the invention proceeds to the next sorting block of the illustrated synchronization prioritization algorithm. The approach implemented according to embodiments may thus attempt to synchronize all the wireless wearable devices once after the gateway resets.

The device synchronization parameters used for sorting the wireless wearable devices at blocks 702 and 703 of the illustrated device synchronization prioritization determination algorithm comprise synchronization status information. In particular, at block 702 the wireless wearable devices are sorted according to their last synchronization completion time (e.g., the "Synchronization Completed Time" attribute stored by the synchronization prioritization gateway). The wireless wearable devices may, for example, be sorted in reverse last synchronization completion time order so that wireless wearable devices having last completed data synchronization further in the past are given higher priority than wireless wearable devices that have completed data synchronization more recently (e.g., wireless wearable devices having larger "Time Difference to Current Time" are given a higher priority, wherein "Time Difference to Current Time"=current time−"Synchronization Completed Time"). At block 703 the wireless wearable devices are sorted according to their last connection time (e.g., the "Last Connection Time" attribute stored by the synchronization prioritization gateway). The wireless wearable devices may, for example, be sorted in reverse last connection time order so that wireless wearable devices having last connected with a synchronization prioritization gateway further in the past are given higher priority than wireless wearable devices that have connected with a synchronization gateway more recently (e.g., wireless wearable devices having larger "Time Difference to Current Time" are given has a higher priority, wherein "Time Difference to Current Time"=current time−"Last Connection Time").

The device synchronization parameter used for sorting the wireless wearable devices at block 704 of the illustrated device synchronization prioritization determination algorithm comprises RSSI information. For example, at block 704 the wireless wearable devices may be sorted according to their RSSI as measured by the synchronization prioritization gateway during the scanning procedure. The wireless devices may, for example, be sorted in order of RSSI magnitude so that wireless wearable devices having higher RSSI are given higher priority than wireless wearable devices that have lower RSSI. Embodiments of a device synchronization prioritization algorithm may utilize a moving average on several RSSI values of a wireless wearable device to smooth out short-term signal fluctuation (e.g., average the RSSI values in 10 seconds).

An example of applying the device synchronization prioritization algorithm as shown in FIG. 7 is illustrated in the sorting example tables below. The first sorting table below shows the order of wireless wearable devices prior to being sorted by a synchronization prioritization gateway executing the device synchronization prioritization algorithm, and the second sorting table below shows the order of wireless wearable devices as sorted by a synchronization prioritization gateway executing the device synchronization prioritization algorithm. In the sorting example shown, area ID value for the synchronization prioritization gateway executing the device synchronization prioritization algorithm is Area_1.

| Wearable Device ID | Area ID | RSSI (dBm) | Last Connection Time | Synchronized Complete Time |
|---|---|---|---|---|
| Sorting Example (Before Sorting) | | | | |
| d1 | Area_2 | −65 | −1 | −1 |
| d2 | Area_1 | −70 | 1542666666 | −1 |
| d3 | Area_1 | −60 | 1542679217 | 1542666766 |
| Sorting Example (After Sorting) | | | | |
| d2 | Area_1 | −70 | 1542666666 | −1 |
| d3 | Area_1 | −60 | 1542679217 | 1542666766 |
| d1 | Area_2 | −65 | −1 | −1 |

In operation according to embodiments, whenever the synchronization prioritization gateway connects to the wireless wearable device, the synchronization prioritization gateway updates the "Last Connection Time" value for that wireless wearable device. In case that the wireless wearable device leaves the signal coverage area of the synchronization prioritization gateway during data synchronization, the wireless wearable device disconnects from the gateway. In applying a priority penalty with respect to particular wireless wearable devices (e.g., to address aberrant behavior or other operation likely to impede efficient and/or timely data synchronization), the next time when the synchronization prioritization gateway performs scanning and sorting and this previously disconnected wireless wearable device is detected, the previously disconnected wireless wearable device is given a lower priority (a priority penalty) compared with a wireless wearable device that has no "Last Connection Time" value (−1).

It should be appreciated that wireless wearable devices may enter or leave the signal coverage area of a synchronization prioritization gateway at any time, disconnection of a wireless wearable device from a gateway may frequency occur during data synchronization, and wireless wearable devices generate new sensor data continuously after synchronized with the gateway. Accordingly, the device synchronization prioritization determination algorithm utilized for determining synchronization priorities for data synchronization according to embodiments of the invention is adapted to accommodate this behavior. For example, the device synchronization prioritization determination algorithm of FIG. 7 operates to give wireless wearable devices having only newer sensor data to be synchronized lower priority than wireless wearable devices having older sensor data to be synchronized. Utilization of such a device synchronization prioritization determination algorithm not only enables the synchronization of data prior to its becoming stale or otherwise undesirably out of date, but also avoids unnecessary reconnection of wireless wearable devices having relatively little sensor data to synchronize and thus facilitates improved battery life of the wireless wearable devices. The priority penalty of embodiments facilitates improved communication bandwidth utilization by avoiding repeated reconnection attempts with a wireless wearable device likely to impede efficient and/or timely data synchronization (e.g., a wireless wearable device experiencing unstable operation, such as moving in and out of the signal coverage area of a synchronization prioritization gateway).

Referring again to flow 600 of FIG. 6, having determined synchronization priorities for data synchronization of the wireless wearable devices at block 604, processing according to the illustrated embodiment of flow 600 proceeds to block 605 to initiate data synchronization with respect to one or more of the wireless wearable devices. In accordance with embodiments of the invention, the synchronization prioritization gateway may establish connections and perform data synchronization with one or more of the highest priority wireless wearable devices (e.g., the top m wireless devices in the sorted list, where m may be 1, 2, 3, etc.). The synchronization prioritization gateway may, for example, connect to the first wireless wearable device in the sorted list, update the "Last Connection Time" value for that wireless wearable device, and poll or otherwise obtain sensor data from the wireless device. Where data synchronization is provided for more than one wireless wearable device in an iteration block 605, the synchronization prioritization gateway may, upon completing or otherwise terminating data synchronization operation with the first wireless wearable device in the sorted list, connect to the next wireless wearable device in the sorted list, update the "Last Connection Time" value for that wireless wearable device, poll or otherwise obtain sensor data from the wireless device, and so on until data synchronization processing has been performed with respect to all m wireless wearable devices. In the case where a connection cannot be established with a wireless wearable device or a disconnection occurs during synchronization, a synchronization prioritization gateway of embodiments may proceed to perform data synchronization processing with respect to the next wireless wearable device in the sorted list instead of the current wireless wearable device. When data synchronization has completed successfully (e.g., all sensor data in the wireless wearable device has been received by the synchronization prioritization gateway), the synchronization prioritization gateway of embodiments updates the "Synchronization Complete Time" value for that wireless wearable device. Correspondingly, when data synchronization has completed successfully the respective wireless wearable device may delete sensor data that has been synchronized with the synchronization prioritization gateway.

Synchronization prioritization gateways of embodiments may be configured to support multiple parallel connections with wireless devices, and thus may connect and synchronize up to predefined n wearable devices in parallel. Such parallel connections and synchronizations may be implemented according to embodiments to maximize BLE bandwidth utilization (e.g., when there are two or more connections, and one device is disconnected, the other devices can use the bandwidth immediately).

In operation to establish a connection according to embodiments of the invention, the wireless wearable device and synchronization prioritization gateway verify the legitimacy of each other. Such verification or authentication may be used to protect the data, to avoid data being exchanged with devices other than those of the group-based data synchronization system, etc. In operation according to embodiments, a global security key is used for verifying the wireless wearable devices and synchronization prioritization gateways.

In a specific example of a verification process, the synchronization prioritization gateway generates a hash value (Hg) using the global security key (e.g., Hg=Hash("global security key" $\oplus$ Bluetooth Address of the wireless wearable device $\oplus$ MAC Address of gateway), wherein $\oplus$ is an exclusive or operation and Hash( ) is a hash function, such as SHA256) and sends the generated has value to the wireless wearable device. Correspondingly, the wireless wearable device generates a hash value (Hw) using the global security key (e.g., Hw=Hash("global security key" $\oplus$ Bluetooth Address of the wireless wearable device $\oplus$ MAC Address of gateway)). It should be appreciated that when the wireless wearable device and synchronization prioritization gateway are in data communication they can obtain the physical addresses of one another as used in the foregoing hash functions. In verifying the other device, each of the wireless wearable device and the synchronization prioritization gateway compare the hash value they generated to the hash value received from the other device and either disconnect if the hash values do not match (e.g., if Hw≠Hg) or proceed to synchronize data if the hash values do match (e.g., if Hw=Hg).

Figure 8:
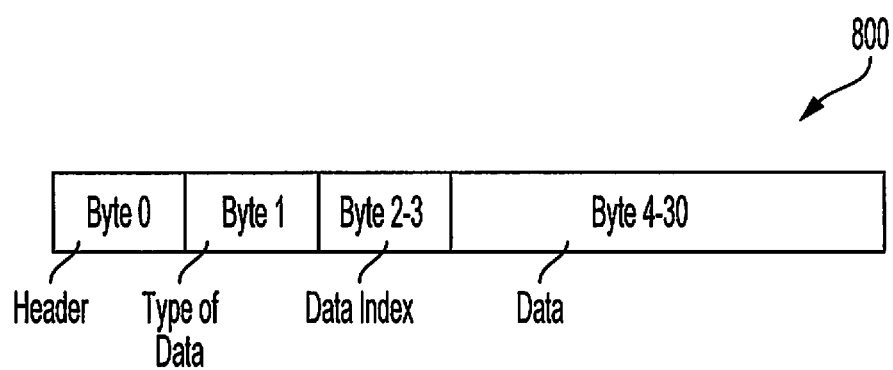
FIG. 8 shows a format of a data packet as utilized in group-based data synchronization of embodiments of the present invention.

In a specific example of operation to synchronize data according to embodiments of the invention, the synchronization prioritization gateway synchronization prioritization gateway sends a "start synchronization" command to the wireless wearable device. In response, the wireless wearable device sends its sensor data to the synchronization prioritization gateway. For example, BLE data packet format 800 shown in FIG. 8 may be used by the wireless wearable device to transmit its sensor data to the synchronization prioritization gateway. Upon receiving a data packet from the wireless wearable device, the synchronization prioritization gateway may acknowledge that the data has been received by returning a "data index" value to the wireless wearable device. The wireless wearable device may send a next data packet to the synchronization prioritization gateway upon receipt of the "data index" value, until all the wireless wearable device sensor data has been transmitted. The wireless wearable device of embodiments sends an "end of the data" message to the synchronization prioritization gateway after all of its data for the data synchronization operation has been transmitted. Upon receipt of the "end of the data" message, or otherwise determining that the transmission of data by the wireless device has concluded, the synchronization prioritization gateway of embodiments creates/updates the synchronization complete record for that wireless wearable device.

Continuing with flow 600 of FIG. 6, after the synchronization prioritization gateway has concluded data synchronization operations with respect with respect to the one or more of the wireless wearable devices (e.g., received sensor data from m wireless wearable devices) at block 605, operation according to the illustrated embodiment proceeds to block 606 where a determination regarding whether the wireless wearable device is to transmitted to a host data collection and processing system. In embodiments of the invention, for example, the synchronization prioritization gateway may store wireless wearable device data for batch transmission to the host data collection and processing system, such as for efficient utilization of network bandwidth, for transmission of the data during off-peak times or other times the network is underutilized, etc. In accordance with embodiments, if the memory of the synchronization prioritization gateway storing the wireless wearable device data is not almost full and there is one or more wireless wearable devices pending for data synchronization, processing according to the illustrated embedment proceeds to block 602 to again perform scanning for wireless wearable devices operating within a signal coverage area of the gateway. If, however, the memory of the synchronization prioritization gateway storing the wireless wearable device data is almost full or there is no wireless wearable devices pending for data synchronization, processing according to the illustrated embodiment proceeds to block 607 for providing the wireless wearable device data to the host data collection and processing system.

At block 607, the synchronization prioritization gateway transmits wireless wearable device data obtained from one or more wireless wearable device to a host data collection and processing system of the group-based data synchronization system. The host data collection and processing system may thus be provided with the most recently collected wireless wearable device data and thus be "synchronized" with those wireless wearable devices. Upon successfully transmitting the wireless wearable device data to the host data collection and processing system, the synchronization prioritization gateway of embodiments may delete that wireless wearable device data.

Figure 9:
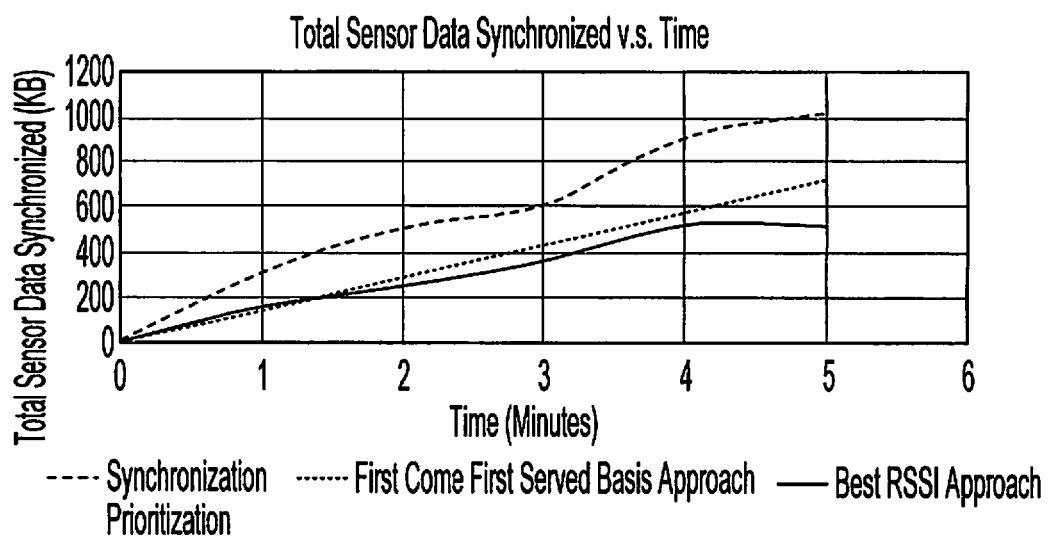
FIG. 9 shows simulation results for device synchronization prioritization determinations according to embodiments of the present invention and conventional ad hoc synchronization strategies.

An experimental synchronization prioritization gateway was constructed and operated to simulate synchronization of wireless device data for wireless wearable devices based upon device synchronization prioritization determinations in accordance with flow 600 of FIG. 6. Specifically, the experimental synchronization prioritization gateway was constructed using a Raspberry Pi 3 Model B with Bluetooth Low Energy on board and was programmed to perform the functions of flow 600. Simulated data synchronization was performed with respect to 20 BLE wearable devices using the experimental synchronization prioritization gateway implementing device synchronization prioritization determinations according to concepts of the present invention and using the conventional ad hoc synchronization strategies "first come first served" and "strongest RSSI first." The results of the simulations are shown in the table below and in FIG. 9. It can be seen from the simulation results that the prioritization based synchronization provided by embodiments of the invention provides data synchronization for more wireless devices in a given period of time than do either of the conventional ad hoc synchronization strategies simulated. Such device synchronization prioritization based synchronization thus facilitates data synchronization with respect to a plurality of wireless devices in a timely and efficient manner.

| | Device Synchronization Prioritization Determination Based Synchronization | First Come First Serviced Based Synchronization | Strongest RSSI First Based Synchronization |
| --- | --- | --- | --- |
| Number of wearable devices synchronized in 5 minutes | 20 | 14 | 10 |
| Percentage of wearable devices synchronized in 5 minutes (number of wearable devices/total number of wearable devices under test) | 100% | 70% | 50% |

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for wireless device data synchronization, the method comprising:
   scanning for wireless devices operating within a signal coverage area of a network node of a group-based data synchronization system, wherein the scanning includes receiving device grouping identifiers for wireless devices of the group-based data synchronization system detected within the signal coverage area;
   prioritizing wireless devices of the group-based data synchronization system detected by the scanning for data synchronization operation based at least in part on their respective device grouping identifiers, wherein the prioritizing provides a sorted order of the wireless devices of the group-based data synchronization system for data synchronization communication; and
   performing data synchronization communication with one or more of the wireless devices of the group-based data synchronization system according to the sorted order of the wireless devices of the group-based data synchronization system.

2. The method of claim 1, wherein the scanning for wireless devices operating within the signal coverage area comprises:
   receiving advertising packets transmitted by the wireless devices of the group-based data synchronization system, wherein the advertising packet transmitted by each wireless device of the group-based data synchronization system operating within the signal coverage area includes the device grouping identifier and a unique identifier for the wireless device.

3. The method of claim 1, wherein the prioritizing wireless devices of the group-based data synchronization system based at least in part on their respective device grouping identifiers comprises:
assigning higher priority to wireless devices of the group-based data synchronization system having their device grouping identifiers matching a device grouping identifier of the network node than to wireless devices of the group-based data system having their device grouping identifiers not matching the device grouping identifier of the network node.

4. The method of claim 3, wherein the device grouping identifiers comprise area identifiers corresponding to an area in which the network node is disposed in.

5. The method of claim 1, wherein the prioritizing wireless devices of the group-based data synchronization system is further based at least in part on one or more device synchronization parameters for each wireless device of the wireless devices of the group-based data synchronization system detected by the scanning.

6. The method of claim 5, wherein the one or more device synchronization parameters comprise last connection time information regarding a last connection established between the wireless device and the network node.

7. The method of claim 5, wherein the one or more device synchronization parameters comprise synchronization completed time information regarding when all sensor data in the wireless device has been successfully synchronized with the network node.

8. The method of claim 5, wherein the one or more device synchronization parameters comprise a communication link metric.

9. The method of claim 8, wherein the communication link metric comprises receive signal strength indicator (RSSI).

10. The method of claim 1, wherein the prioritizing wireless devices of the group-based data synchronization system is further based at least in part on a priority penalty attribute implemented with respect to a particular wireless device of the wireless devices of the group-based data synchronization system to address aberrant behavior of the particular wireless device.

11. The method of claim 1 wherein the performing data synchronization communication with one or more of the wireless devices of the group-based data synchronization system comprises;
performing data synchronization communication with a plurality of the wireless devices of the group-based data synchronization system in an order of the sorted order of the wireless devices of the group-based data synchronization system.

12. The method of claim 1, wherein the data synchronization communication with the one or more wireless devices comprise Bluetooth-low-energy (BLE) communications.

13. The method of claim 1, wherein the wireless devices comprise wireless wearable devices.

14. The method of claim 1, wherein the network node comprises a synchronization prioritization gateway of the group-based data synchronization system.

15. A network node for wireless device data synchronization, the network node comprising:
a processor;
a wireless communication interface operable under control of the processor and configured for wireless communication with wireless devices of a group-based data synchronization system operating within a signal coverage area of the network node; and
a memory in communication with the processor, wherein the memory stores code executable by the processor for performing wireless device data synchronization communication with wireless devices of the group-based data synchronization system via the wireless communication interface, wherein the processor executing the code causes the network node to:
scan for wireless devices operating within the signal coverage area of the network node and receive device grouping identifiers for wireless devices of the group-based data synchronization system detected within the signal coverage area;
prioritize wireless devices of the group-based data synchronization system detected by the network node based at least in part on their respective device grouping identifiers and provide a sorted order of the wireless devices of the group-based data synchronization system for data synchronization communication; and
perform data synchronization communication with one or more of the wireless devices of the group-based data synchronization system according to the sorted order of the wireless devices of the group-based data synchronization system.

16. The network node of claim 15, wherein the network node receives advertising packets transmitted by the wireless devices of the group-based data synchronization system during the scan for wireless devices operating within the signal coverage area, and wherein the advertising packet transmitted by each wireless device of the group-based data synchronization system operating within the signal coverage area includes the device grouping identifier and a unique identifier for the wireless device.

17. The network node of claim 15, wherein the network node, when prioritizing wireless devices of the group-based data synchronization system based at least in part on their respective device grouping identifiers, assigns higher priority to wireless devices of the group-based data synchronization system having their device grouping identifiers matching a device grouping identifier of the network node than to wireless devices of the group-based data system having their device grouping identifiers not matching the device grouping identifier of the network node.

18. The network node of claim 17, wherein the device grouping identifiers comprise area identifiers corresponding to an area in which the network node is disposed in.

19. The network node of claim 15, wherein the network node further prioritizes the wireless devices of the group-based data synchronization system based at least in part on one or more device synchronization parameters for each wireless device of the wireless devices of the group-based data synchronization system detected by the scanning.

20. The network node of claim 19, wherein the one or more device synchronization parameters comprise last connection time information regarding a last connection established between the wireless device and the network node.

21. The network node of claim 19, wherein the one or more device synchronization parameters comprise synchronization completed time information regarding when all sensor data in the wireless device has been successfully synchronized with the network node.

22. The network node of claim 19, wherein the one or more device synchronization parameters comprise a communication link metric.

23. The network node of claim 22, wherein the communication link metric comprises receive signal strength indicator (RSSI).

24. The network node of claim 15, wherein the network node further prioritizes the wireless devices of the group-based data synchronization system based at least in part on a priority penalty attribute implemented with respect to a particular wireless device of the wireless devices of the group-based data synchronization system to address aberrant behavior of the particular wireless device.

25. The network node of claim 15 wherein the network node, when performing data synchronization communication with one or more of the wireless devices of the group-based data synchronization system, performs data synchronization communication with a plurality of the wireless devices of the group-based data synchronization system in an order of the sorted order of the wireless devices of the group-based data synchronization system.

26. The network node of claim 15, wherein the wireless communication interface comprises a Bluetooth-low-energy (BLE) communication interface, and wherein the data synchronization communication with the one or more wireless devices comprise BLE communications.

27. The network node of claim 15, wherein the wireless devices comprise wireless wearable devices.

28. The network node of claim 15, wherein the network node comprises a synchronization prioritization gateway of the group-based data synchronization system, wherein the network node further comprises:
a wireless communication interface operable under control of the processor and configured for communication with a data collection and processing server of the group-based data synchronization system.

29. A method of wireless device data synchronization for wireless wearable devices of a group-based data synchronization system, the method comprising:
scanning, by a synchronization prioritization gateway, for wireless wearable devices operating within a signal coverage area of the synchronization prioritization gateway, wherein the scanning obtains, for each wireless wearable device of the group-based data synchronization system detected by the scanning, unique device identification, device grouping identifier, and received signal strength indicator (RSSI);
generating, by the synchronization prioritization gateway, a list of wireless wearable devices detected by the scanning, wherein the list of wireless wearable devices includes information, for each wireless wearable device of the group-based data synchronization system detected by the scanning, comprising the unique device identification, the device grouping identifier, a last connection time, a synchronization completed time, and the RSSI;
sorting, by the synchronization prioritization gateway using a prioritization algorithm, the list of wireless wearable devices based on the device grouping identifier, a last connection time, a synchronization completed time, and the RSSI for each wireless wearable device of the group-based data synchronization system detected by the scanning; and
performing, by the synchronization prioritization gateway, data synchronization communication with a plurality of wireless wearable devices of the group-based data synchronization system in an order of the list of wireless wearable devices as sorted based on the device grouping identifier, a last connection time, a synchronization complete time, and the RSSI.

30. The method of claim 29, wherein the performing data synchronization communication with a plurality of wireless wearable devices comprises:
performing data synchronization communication in parallel for at least two of the wireless wearable devices.

31. The method of claim 29, further comprising:
performing authentication with respect to the synchronization prioritization gateway and a particular wireless wearable device of the plurality of wireless wearable devices using a global security key prior to performing data synchronization communication with respect to the particular wireless wearable device.

32. The method of claim 29, wherein the sorting the list of wireless wearable devices using the prioritization algorithm comprises:
sorting the list of the wireless wearable devices by the device grouping identifier for each wireless wearable device of the list;
sorting the list of the wireless wearable devices, as provided from the sorting by device grouping identifier, by the synchronization completed time for wireless wearable devices of the list;
sorting the list of wireless wearable devices, as provided from the sorting by synchronization completed time, by last connection time for wireless wearable devices of the list; and
sorting the list of wireless wearable devices, as provided from the sorting by last connection time, by RSSI.

33. The method of claim 32, wherein the sorting the list of wireless wearable devices by the device grouping identifier comprises:
assigning higher priority to wireless wearable devices of the list having their device grouping identifiers matching a device grouping identifier of the synchronization prioritization gateway than to wireless devices of the list having their device grouping identifiers not matching the device grouping identifier of the synchronization prioritization gateway.

34. The method of claim 33, wherein the device grouping identifiers comprise area identifiers corresponding to an area in which the synchronization prioritization gateway is disposed in.

35. The method of claim 29, wherein the sorting the list of wireless wearable devices using the prioritization algorithm comprises:
implementing a priority penalty attribute with respect to a particular wireless wearable device of the wireless wearable devices of the group-based data synchronization system to address aberrant behavior of the particular wireless wearable device.

* * * * *